June 17, 1958  E. PAIKENS ET AL  2,838,894
APPARATUS FOR EVACUATING AND SEALING BAGS
Filed Sept. 26, 1956  2 Sheets-Sheet 1
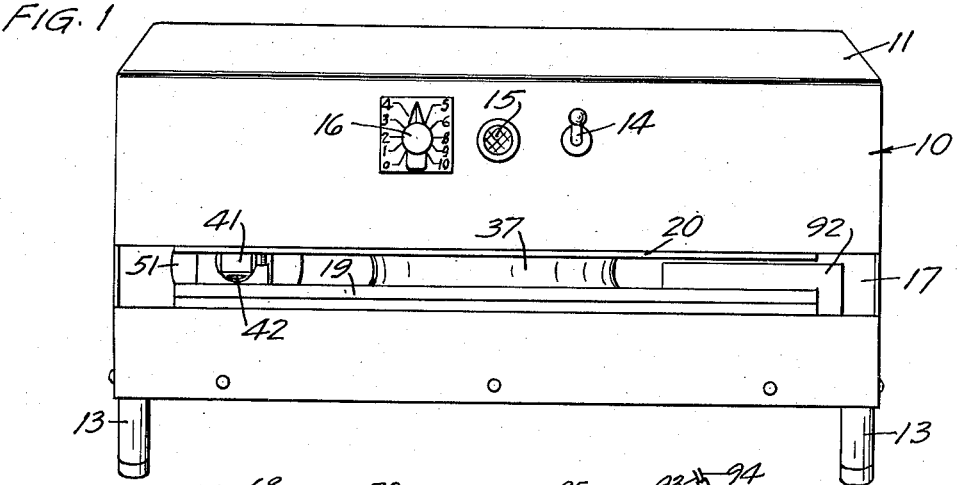
FIG. 1
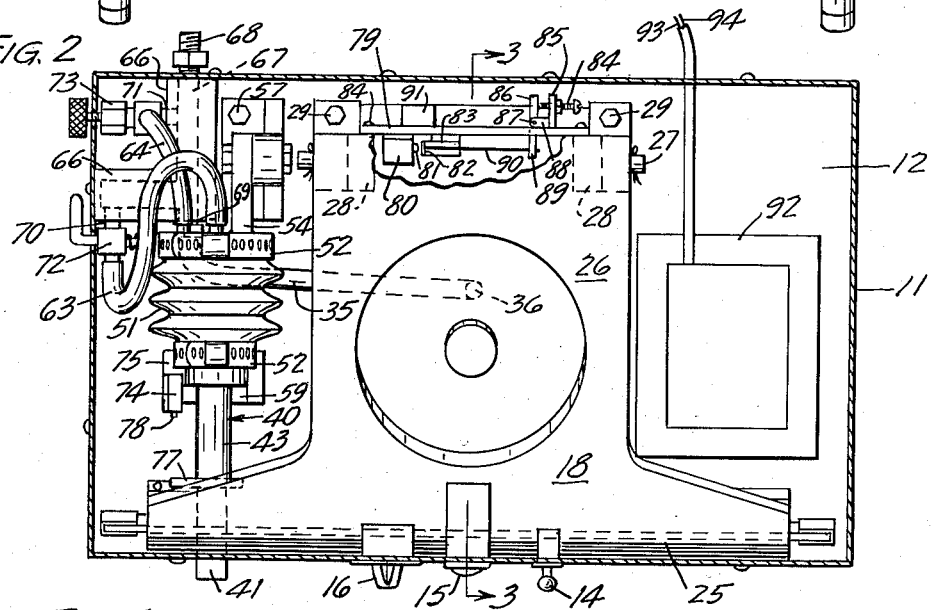
FIG. 2
FIG. 3
INVENTORS
EDWARD PAIKENS
DOUGLAS M. SKOGLUND
BY
Williamson, Schroeder, Adams & Meyers
ATTORNEYS June 17, 1958 E. PAIKENS ET AL 2,838,894
APPARATUS FOR EVACUATING AND SEALING BAGS
Filed Sept. 26, 1956
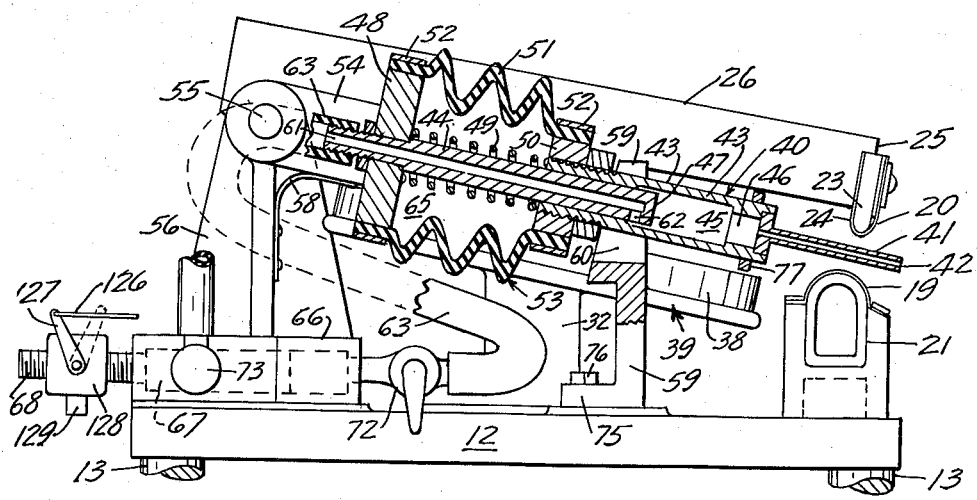
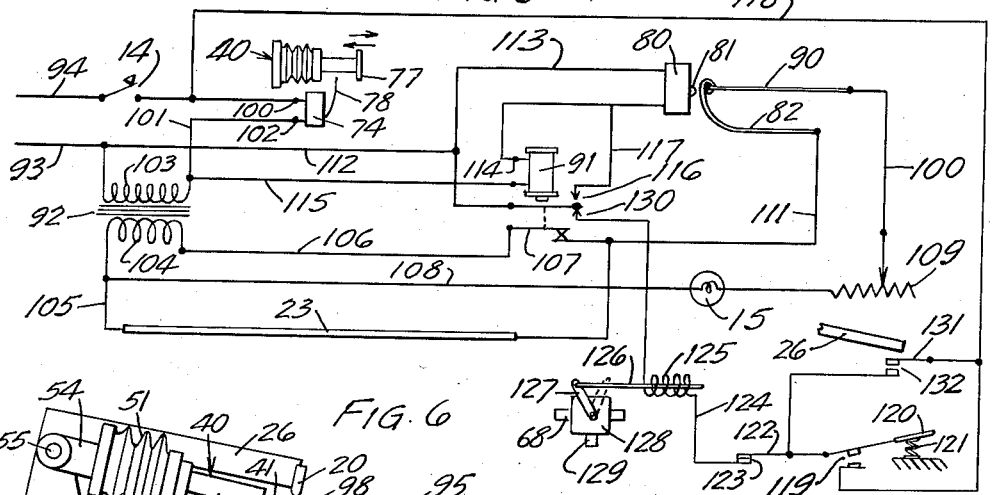
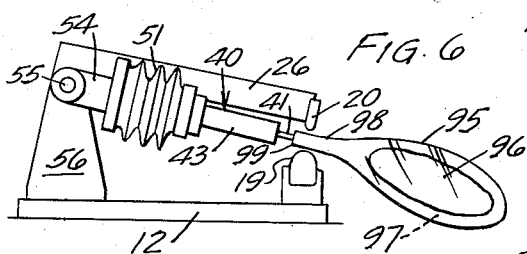
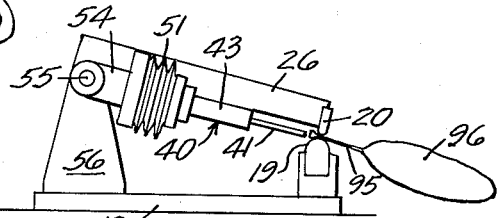
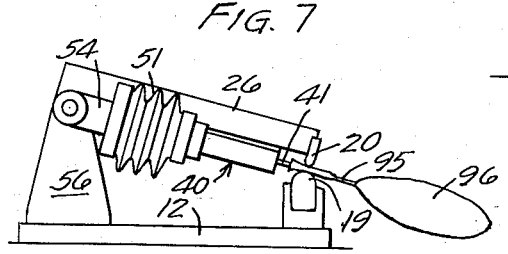
INVENTORS
EDWARD PAIKENS
DOUGLAS M. SKOGLUND
BY Williamson, Schroeder, Adams & Meyers
ATTORNEYS United States Patent Office 2,838,894
Patented June 17, 1958

2,838,894
APPARATUS FOR EVACUATING AND SEALING BAGS

Edward Paikens and Douglas M. Skoglund, Minneapolis, Minn., assignors to Kenfield Corporation, Minneapolis, Minn., a corporation of Minnesota Application September 26, 1956, Serial No. 612,248

8 Claims. (Cl. 53—79)

This invention relates to the sealing of filled collapsible bags, and more particularly to apparatus for evacuating and sealing heat-sealable bags with articles of merchandise therein.

It is an important object of the invention to provide an efficient, safe, and relatively inexpensive apparatus for rapidly and sequentially evacuating a filled thermoplastic bag and then sealing it.

Another object of the invention is to provide apparatus for evacuating and sealing a filled thermoplastic bag wherein the bag need be positioned but once for the dual operation and only a small sealing margin need be employed, thereby resulting in economy in both labor and material.

A further object of the invention is to provide, in apparatus of the class described, a novel vacuum system wherein the same source of vacuum may be utilized to actuate clamping jaws, to evacuate fluid from a plastic bag containing a product, to collapse the bag about the contents thereof, and then to withdraw the means for evacuating the bag to leave it in condition for sealing.

A still further object of the invention is to provide jaws which first furnish light mechanical clamping force to maintain a thermoplastic bag in closed condition while it is being evacuated by an interposed nozzle, following which the jaws, in their clamped position, under increased uniform force, then provide heat for sealing the closure, the nozzling having been withdrawn from between the jaws and from the bag.

These and other objects and advantages of the invention will more fully appear from the following desscription made in connection with the accompanying drawings, wherein the same references apply to the same or similar parts throughout the several views, and in which:

Figure 1 is a front perspective view of our apparatus for evacuating and sealing bags;

Figure 2 is a horizontal section of the apparatus taken on the line 2—2 of Figure 1;

Figure 3 is a vertical section taken on the line 3—3 of Figure 2;

Figure 4 is an enlarged vertical section taken on the line 4—4 of Figure 2 and showing the nozzle and jaws in normal or relaxed position;

Figure 5 is a diagrammatic representation of the electrical wiring system utilized in our invention;

Figure 6 is an enlarged and somewhat schematic representation of the jaw and nozzle members with an unsealed bag inserted over the nozzle prior to operation of the machine;

Figure 7 is a view similar to that of Figure 6, showing the jaws in clamping relation and fluid evacuated from the bag; and Figure 8 is a view similar to that of Figure 6, showing the clamped and evacuated bag in sealing position with the nozzle retracted.

With continued reference to the drawing, Figure 1 shows the entire apparatus encased in a housing indicated generally at 10. The housing may comprise a cover 11 and a base 12 to which are secured suitable supporting legs 13 as shown in Figure 3. The housing cover 10 is provided with a master switch 14, a signal light 15, and a dial indicator 16, the function of which will be described later in this specification. Cover 11 is provided with a slotted opening 17 extending substantially for the width thereof to permit insertion and withdrawal of the open tops of bags to be evacuated and sealed.

To the base 12 is secured the clamping and sealing mechanism 18, as shown in Figures 2 and 3. The sealing and clamping mechanism 18 comprises a pair of jaws 19 and 20 which are normally opened and in opposed relation as in Figure 3. Lower jaw 19 may be fixed, as shown, the jaw being constructed of stiff but resilient material inserted into a groove or trough 21 formed at the forward edge of base 12. The jaw 19 may be covered with heat-resistant sheet material 22 so as to extend the operating life of the clamping and sealing mechanism. The movable jaw 20 has an electrical heating element 23 extending for the length thereof and may be similarly covered with heat-resistant exterior sheeting 24, as shown. Movable jaw 20 is mounted at the forward edge 25 of a swingable plate 26, the latter being pivotally mounted at 27 to a pair of upstanding brackets 28 secured in turn as by bolts 29 to the base 12. The swingable plate 26 is provided with a depending boss 30 which, in turn, furnishes a shoulder 31 below the plate 26. In spaced clearance below the boss 30 is an angulated mount 32 which is secured to base 12 by means such as bolts 33. The angulated mount 32 has a short upstanding rim 34 of the same general configuration as the shouldered portion 31 on boss 30. A fluid passageway 35 is secured to the angulated mount 32 and terminates in an inner orifice 36, as shown in Figure 3. A flexible and air-tight bellows 37 is interposed between the boss 30 and angulated mount 31 and is secured respectively at its upper and lower edges by clamping bands 38 to shoulder 31 and rim 34. The swingable plate 26, together with the angulated mount 32 and bellows 37, comprises generally a power mechanism 39 for bringing the movable jaw 20 into resilient pressing engagement with the the fixed jaw 19 when vacuum is applied thereto through the fluid passageway 35.

An evacuating member is illustrated generally at 40 in Figures 2 and 4, and this evacuating member has a forwardly extending broad and flat nozzle 41 terminating in a slit orifice 42 and adapted to be retracted from between jaws 19 and 20 in the cycle of operation which will be subsequently described. The evacuating nozzle 41 is secured to the tubular body member 43 which is slidably mounted, in turn, on the elongated hollow shaft 44, as shown in Figure 4. The forward slit orifice 42 of evacuating nozzle 41 communicates with chamber 45 interiorly of the tubular body 43. Chamber 45 has a restricted forward bore 46 which is in longitudinal alignment with the forward closed end 47 of the shaft 44 and is adapted to snugly receive end 47 in air-tight relation when the tubular body 43 and its forward nozzle portion 41 are fully retracted. Secured to the shaft 44 in annular fluid-tight relation therewith is a plate 48. A compression spring 49 is interposed between the plate 48 and the rear end of tubular body 43, the compression spring 49 encircling shaft 44, as shown in Figure 4. The rear end of tubular body 43 is exteriorly threaded for a short distance and is adapted to threadably receive in air-tight relation an opposed annular plate 50 spaced from the annular plate 48, as shown. A vacuum bellows 51 is tightly clamped at its ends respectively to plates 48 and 50 by clamping bands 52, and these members constitute generally a power mechanism 53. The plate 48 has a rearwardly extending bearing mount 54 which is pivotally mounted at 55 to a support 56 secured in turn by bolts 57 to the base 12, as shown in Figure 2.

A special feature of our invention resides in the swingable mounting of the retractable nozzle 41, and this utilizes a spring 58 which constantly urges the bracket 54 in counter-clockwise direction, as viewed in Figure 4. An upstanding abutment or stop block 59 surrounds the tubular body portion 43 of the retractable nozzle 41 and limits the upward movement thereof under spring force to raise the nozzle 41 a predetermined distance above the fixed jaw 19. A vertically elongated opening or space 60 through the stop block 59 receives the broad and flat nozzle 41 and permits it to be depressed resiliently against fixed jaw 19 when the movable jaw 20 swings downwardly thereagainst.

In order to effect retraction of the retractable nozzle 41, we provide a hollow passageway 61 within the longitudinal shaft 44 and this passageway terminates laterally in an orifice 62 adjacent the forward closed end 47 of the shaft 44. The orifice 62 permits intercommunication between passageway 61 and chamber 45 when the nozzle is in extended position and during retraction thereof until forward end 47 enters the reduced bore 46 which interrupts and seals the orifice 62 so long as the nozzle remains fully retracted. A flexible tubular connector 63 communicates with passageway 61 in shaft 44 for supplying fluid evacuation from slit orifice 42 through the retractable nozzle 41. Another tubular connector 64 communicates through the rear plate 48 with the space 65 within bellows 51 and between plates 48 and 50. Thus, when the retractable nozzle is pulled rearwardly a sufficient distance so that the orifice 62 is sealed by the reduced portion 46, the fluid line 61 is stopped and no further fluid travel will take effect through the latter passageway. Vacuum applied to the evacuating member 40 will, of course, rapidly build up when no relief is permitted.

A multiple connector fluid block 66 is provided with a hollow interior 67 which in turn communicates with the primary vacuum source line 68. The hollow interior 67 terminates in several tubular outlets 69, 70 and 71 which communicate respectively with the clamping and sealing mechanism 18 through tubular passage 35, the flexible tubular connector 63 and with the tubular connector 64, all as shown in Figures 2 and 4. A stop cock 72 is interposed between the outlet 70 and tube 63 while fluid flow regulating means such as the needle valve assembly 73 is interposed between outlet nozzle 71 and the tubular connector 64. A single source of vacuum may be employed to operate the several mechanisms in sequence, as will be described.

In the electrical portion of the invention, a microswitch 74 is mounted on stop block 59 which, in turn, is secured to base 12 as by bolts 76. An abutment 77 has a foot 75 which is secured to the tubular body 43 and extends laterally therefrom in alignment with finger 78 of microswitch 74. The microswitch 74 initiates the heat sealing operation and the timing thereof.

Mounted on the insulating panel 79 is the heat control microswitch 80 having a finger 81 adapted to be contacted by spring arm 82 which is secured at its lower end 83 to the insulating panel 79, which in turn is secured to the rear of upstanding brackets 28. Also mounted to insulating panel 79 is an adjusting screw 84 which may be retracted and advanced threadably in the stationary ear 85 to bear against a lever arm 86 at its outward extension and cause the arm 86 to pivot about its pin connection 87 with the yoke 88. Inner end 89 of the lever arm 86 has secured thereto an expansible resistance wire 90, the other end of which is secured to spring arm 82 so as to normally maintain the arm out of contact with the finger 81 on microswitch 80. A locking relay 91 is secured to panel 79 so as to control heat to the heating element 23 as will be described in detail under the operation hereof. An electrical transformer 92 is mounted on base 12 and is connected to a source of electrical energy through leads 93 and 94, as shown in Figure 2.

*Operation*

Referring now to Figures 6 through 8, and with reference also to the wiring diagram of Figure 5, prior to initiation of an evacuating and sealing cycle a heat-sealable bag 95 of flexible material and containing a non-fluid product 96, suspended in, or in the presence of, a fluid 97 such as air, is brought to the broad and flat protruding nozzle 41 and the open-topped portion 98 of bag 95 is slipped over the end thereof with the top margins 99 in flat contact. The jaws 19 and 20, being resilient in nature, will form themselves around the nozzle 41 so as to provide an air-tight clamping seal between the margins 99 when the jaws are caused to converge. Convergence of jaws 19 and 20 is created by applying a partial vacuum to the block 66 through the source line 68 and the open communication through the tubular passageway 35 causes the bellows 37 to collapse and thereby pivoting the plate 26 downwardly about pivot 27. It will be noted that simultaneously with the evacuation of bellows 37 air begins to be drawn into the orifice 42 of nozzle 41 via chamber 45, orifice 62, longitudinal passageway 61, the flexible tubular connector 63, petcock 72, nozzle 70 and into the hollow space 67 of block 66. Even though no restriction is placed on the inlet orifice 42 of nozzle 41, the bellows 37 will continue to collapse until the movable jaw 20 lightly contacts the bag margins 99 and presses around the nozzle 41 which is inserted between the jaws and into the bag top. The orifice 42 is designed to have a sufficiently small area so as, in conjunction with the force of vacuum applied through the main line 68, to exert collapsing force upon bellows 37, whether or not air or other fluid is permitted to pass unrestricted through nozzle 41. As the jaws 19 and 20 press against the margins 99 and the flat nozzle 41 fluid 97 will be withdrawn from bag 95 and the bag will collapse into intimate contact with the product 96, as shown in Figure 7. When all of the fluid 97 has been withdrawn, the vacuum force will start to build up in the evacuating member 40, and in bellows 37, causing the jaws 19 and 20 to press together more tightly, but never exceeding the maximum pressure created by one atmosphere of air under perfect vacuum.

As the vacuum continues to build up within the hollow space 67 of block 66, the decreasing air pressure exerts its pulling force through needle valve 73 and tubular connector 64 to chamber 65 within the bellows 51. The power mechanism 53 of the evacuating member 40 then begins to retract as bellows 51 collapse and the tubular body 43 slides rearwardly also bringing the nozzle 41 which is attached thereto rearwardly from between the bag margins 99 and jaws 19 and 20, as shown in Figure 8. Just as the nozzle orifice 42 is pulled outwardly and would be free to suck in atmospheric air, the restricted bore 46 covers the orifice 62 and prevents the entrance of atmospheric air through nozzle 41 which would, if not so prevented, tend to permit premature release of the nozzle to extend again forwardly under the force of compression spring 49.

When evacuating member 40 and its retractable nozzle 41 are in fully retracted and locked position as noted, the abutment 77 will press against the finger 78 of microswitch 74, thus initiating the sealing cycle. In the meantime, of course, the bag margins 99 are maintained in overlapped contact between jaws 19 and 20 which exert a steady pressure under the influence of the full vacuum applied to main line 68. Prior to and during withdrawal of the nozzle 41, the lighter force applied to jaws 19 and 20 is desirable in that wear and damage to the nozzle and to the bag margins is minimized.

Under certain conditions, it may not be desired to utilize the evacuating feature, in which case the petcock 72 may be closed and the power mechanism 53 will be immediately actuated upon collapse of bellows 37 in power mechanism 39 which applies clamping pressure to the bag margins 99 through jaws 19 and 20. As before, the heating cycle is begun as soon as abutment 77 presses against finger 78 of the microswitch 74.

The rapidity with which the vacuum plunger 40 responds to the build-up of vacuum upon collapse of the bag as in Figure 7, depends on the setting of the regulator 73. We have found that several types of regulating valves may be employed and a simple needle valve functions well for most purposes. If it is desired to obtain relatively high exhaustion of fluid from the bag, then the valve or regulator 73 is set with greater restriction to delay withdrawal of the nozzle. Conversely, if less complete exhaustion is desired, then the regulator can be opened to give lesser restriction to the flow of fluid and bellows 51 will be collapsed faster to withdraw the nozzle sooner.

Referring now to the wiring diagram of Figure 5, the electrical energy source enters through lines 93 and 94. The line 94 is provided with master switch 14 and connects with terminal 100 of the microswitch 74 and continues in series through terminal 102 and conductor 101 to the primary coils 103 of transformer 92. Thus, when abutment 77 strikes finger 78 and closes microswitch 74, then the primary 103 will be energized and a current will be induced in the secondary coils 104 of transformers 92 which will be of lower voltage and higher amperage. The electrical circuit from secondary 104 passes through lead 105 and to the high resistance heating element 23 to immediately energize the element and cause it to generate heat within the jaw 20. This heat is conducted to the bag margins 99 so as to seal them together. The circuit is completed through lead 106 in which the tandem electrical locking switch 107 is interposed. Switch 107 is normally in closed position to permit the immediate energization of the heating element 23. In parallel with the heating circuit 23 is a timing circuit through lead 108, variable resistance 109, lead 110 and expansible conductor element 90, thence through spring arm 82, lead 111, and back to lead 106 to close the parallel circuit. A signal lamp 15 may be interposed in line 108 to indicate whenever the timing unit is energized. This signal lamp is visible through the cover 11, as shown in Figure 1. Variable resistance 109 is controlled by the indicating knob 16 also mounted on the outside of cover 11.

As the expansible wire 90 heats and expands, spring 82 advances toward the finger 81 of the microswitch 80, thereby closing a parallel circuit from line conductor 93 through conductor 112 and lead 113 which, in turn, is connected to lead 114 through locking relay 91 and thence through conductor 115 which again connects with line conductor 94 through lead 101 when the microswitch 74 is closed. As soon as relay 91 is energized, the locking switch 107 opens, contact 130, and closes the opposite contact 116, thus maintaining the relay 91 energized through conductor 117 and permitting the main heating element 23 to cool off. Since the relay is locked in its closed position, the timing element 90 will retract from microswitch 80 to interrupt current therethrough but still will maintain the relay lock and switch 107 in open position. This condition obtains until the vacuum line 68 is released and the abutment 77 is permitted to move forwardly with the evacuating nozzle 41 thus interrupting the circuit through the locking relay 91 and permitting switch 107 to return to its normally closed position. The jaws 19 and 20 then open and nozzle 41 assumes its intermediate projected position in readiness for another evacuating and sealing cycle.

A useful operating system for initiating the application of vacuum to the block 66 and for rendering a portion of the operating cycle automatic is described as follows. Line 94 connects with the lead 118 which, in turn, connects with a foot-operated starting switch 119 normally biased to open position and having a pedal 120 and biasing means such as spring 121 for maintaining switch 119 open. The circuit continues through lead 122 which, in turn, connects with manual emergency stop switch 123 normally closed but which may be made readily available for rapid opening should an operator desire. The circuit then continues through lead 124 and solenoid 125, the latter having an actuating arm 126 connected with valve arm 127 on valve 128. The valve 128 is interposed in the vacuum source line 68 and is adapted to move from its normal position at the left, as shown in Figure 4, to the dotted line position to the right which changes the valve from atmospheric connection through opening 129 with the block cavity 67 to an interconnection with the vacuum source (not shown) through line 68 with the atmospheric vent 129 then closed. Lead 124 continues through solenoid 125 to switch contact 130 in the locking switch 107. The contact 130 is in normally closed position when solenoid 91 is not energized.

A parallel holding circuit is established through conductor 131 from conductor 118 to conductor 122. Holding switch 132 is interposed in the parallel line and is adapted to be closed in response to contact with the swingable plate 26 to which is secured the movable jaw 20 as previously described.

The operation of the circuit is as follows. Foot-operated pedal 120 is depressed with the sealable bag in position between jaws 20 and 21, as previously described, and switch 119 will close the circuit through conductor 118, 122, emergency switch 123, line 124, solenoid 125 and normally closed switch 130, conductor 112 and back to line 93. Energizing the solenoid 125 will throw valve 128 to the dotted line position of Figure 4, thereby interrupting the atmospheric connection through vent 129 and establishing application of vacuum to the vacuum source line 68, collapsing bellows 37 and initiating the evacuating and sealing cycle as previously described. As soon as the jaw 20 and plate 26 swing downwardly, the holding switch 132 is closed by contact therewith and a holding circuit is established in parallel with the foot-operated starting switch 119. The operator's foot may then be removed from pedal 120 while the remainder of the cycle progresses in accordance with previous description. After interruption of the timing mechanism solenoid 91 will be energized and the switch contacts 130 to lock switch 107 will be opened, thus deenergizing solenoid 125. The spring-pressed valve arm 127 will thus return to the full line position of Figure 4 to interrupt the application of vacuum to the block 66 and permit atmospheric air to enter therein through vent 129. The bellows 37 will then expand, raising plate 26 and movable jaw 20 to open position and reestablishing the initial conditions as set forth diagrammatically in Figure 5. The contact 130 will again be established with conductor 112 and the holding switch 132 will remain open, as will the foot-operated starting switch 119 until another cycle of operations is begun. It will be noted that the foot-operated starting switch 119 remains responsive to foot operation until the holding switch 132 is established by movement of plate 26. Thus, if an operator's fingers should be accidentally caught between jaws 20 and 21, his foot may be removed from pedal 120 and the holding circuit will never become established through switch 132. However, once the jaws are properly set with switch 132 closed, then the cycle will be set in operation to evacuate and seal bag 95. Now, however, if at any time it be desired to interrupt the cycle, the manual emergency stop switch may be opened and the spring-pressed valve arm 127 will immediately return to its full line position so as to permit atmospheric air to enter the bellows 37 and 51, thus permitting return of the jaws 20 and 21 to open position and the return of nozzle 41 to its interposed and spaced relationship with the jaws. The aforementioned features render the entire device particularly safe and do not require the automatic completion of cycle sequences once they have begun, as is the case with ordinary conventional cam-operated timing cycles.

It will, of course, be understood that various changes may be made in the form, details, arrangement and proportions of the parts without departing from the scope of the invention.

What we claim is:

1. Apparatus for evacuating and sealing heat-sealable open-topped bags containing a product, said apparatus comprising, a pair of clamping and heat-sealing jaws adapted to converge in pressing engagement with lapped margins of an open-topped bag, a retractable vacuum nozzle normally protruding between said clamping and heat-sealing jaws and adapted to extend into the open top of said bag for evacuating fluid therefrom, a common vacuum power source for converging said jaws and for evacuating fluid through said nozzle, power means actuable after evacuation of a bag to retract said nozzle from the bag and said jaws, and heating means in said jaws for sealing the lapped margins of the evacuated bag while still between the jaws and with the nozzle withdrawn.

2. Apparatus for evacuating and sealing heat-sealable open-topped bags containing a product, said apparatus comprising, a pair of clamping and heat-sealing jaws, one of said jaws being fixed and the other movable, the movable jaw being adapted to converge in pressing engagement with the fixed jaw to clamp the lapped margins of an open-topped bag, a retractable vacuum nozzle normally protruding between said jaws and adapted to extend into the open top of said bag for evacuating fluid therefrom, said retractable nozzle being mounted for swinging movement away from said fixed jaw, an abutment limiting said swinging movement of the nozzle to a position medially of said fixed and movable jaws in their open position, power means actuable after evacuation of a bag to retract said nozzle from the bag and said jaws, and heating means in said jaws for sealing the lapped margins of the evacuated bag while still between the jaws and with the nozzle withdrawn.

3. A vacuum system for operating bag evacuating and heat-sealing apparatus having clamping and sealing jaws and an evacuating nozzle to remove fluid from a filled bag before sealing, said system comprising a vacuum power mechanism connected with said clamping and sealing jaws for bringing them into engagement with unsealed margins of a bag, said bag having an evacuating nozzle inserted through the unsealed margins and lying between the clamping and sealing jaws, a vacuum power mechanism connected to said evacuating nozzle for retracting said nozzle from the unsealed bag margins and from the clamping and sealing jaws, a common source of fluid evacuation communicating with said nozzle and said second mentioned power mechanism, and means regulating actuation of the second mentioned power mechanism for withdrawing said nozzle after a predetermined degree of partial vacuum has been applied to the bag through said nozzle.

4. A vacuum system for operating bag evacuating and heat-sealing apparatus having clamping and sealing jaws and an evacuating nozzle to remove fluid from a filled bag before sealing, said system comprising a vacuum power mechanism connected with said clamping and sealing jaws for bringing them into engagement with unsealed margins of a bag, said bag having an evacuating nozzle inserted through the unsealed margin and lying between the clamping and sealing jaws, a vacuum power mechanism connected to said evacuating nozzle for retracting said nozzle from the unsealed bag margins and from the clamping and sealing jaws, a pair of passageways leading from a common source of fluid evacuation respectively to said nozzle and to said second mentioned power mechanism, and valve means in the passageway leading to the second mentioned power mechanism restricting the passage of fluid therethrough to delay actuation of said second mentioned power mechanism whereby the nozzle will not be retracted until said bag has become evacuated of its fluid.

5. In apparatus for evacuating fluid and for heat-sealing open-topped heat-sealable bags containing a product and fluid such as air, the combination of a pair of resilient jaws movable convergently to clamp in fluid-tight relation the unsealed top margins of an open-topped bag, a retractable wide and flat nozzle normally positioned in protruding relation through said jaws and adapted to be yieldably engaged by said jaws together with the top of a bag inserted thereover, a heating element longitudinally disposed in at least one of said jaws, means for retracting said nozzle from the evacuated bag and from between said jaws, and actuating means to energize said heating element and thereby effect sealing of the bag.

6. In apparatus for evacuating fluid and for heat-sealing open-topped heat-sealable bags containing a product and fluid such as air, the combination of a pair of resilient jaws movable convergently to clamp in fluid-tight relation the unsealed top margins of an open-topped bag, a retractable wide and flat nozzle normally positioned in protruding relation between said jaws and adapted to be yieldably engaged by said jaws together with the top of a bag inserted thereover, a heating element longitudinally disposed in at least one of said jaws, vacuum means communicating with said nozzle for sequentially exhausting fluid through said nozzle and for retracting the nozzle, and actuating means engaged by said nozzle in its retracting movement to energize said heating element and thereby to effect sealing of the bag.

7. In apparatus for evacuating fluid and for heat-sealing open-topped heat-sealable bags containing a product and fluid such as air, the combination of a pair of resilient jaws movable convergently to clamp in fluid-tight relation the unsealed top margins of an open-topped bag, a retractable wide and flat nozzle normally positioned in protruding relation between said jaws and adapted to be yieldably engaged by the jaws together with the top margins of a bag inserted thereover, power means actuable to move said resilient jaws convergently, a heating element longitudinally disposed in at least one of said jaws, means for retracting said nozzle from the evacuated bag and from between said jaws, an electrical circuit for energizing said power means, a hold-down contact switch for closing the power circuit, a holding circuit in parallel with said first mentioned circuit, and a switch adapted to be closed by said jaws in their converged relation in said holding circuit for maintaining said power means energized until said electrical circuit is interrupted.

8. In apparatus for evacuating fluid and for heat-sealing open-topped heat-sealable bags containing a product and fluid such as air, the combination of a pair of resilient jaws movable convergently to clamp in fluid-tight relation the unsealed top margins of an open-topped bag, a retractable wide and flat nozzle normally positioned in protruding relation between said jaws and adapted to be yieldably engaged by the jaws together with the top margins of a bag inserted thereover, power means actuable to move said resilient jaws convergently, a heating element longitudinally disposed in at least one of said jaws, means for retracting said nozzle from the evacuated bag and from between said jaws, a circuit for energizing said heating element, an electrical circuit for energizing said power means, a hold-down contact switch for closing the power circuit, a holding circuit in parallel with sid first mentioned circuit, a switch adapted to be closed by said jaws in their converged relation in said holding circuit for maintaining said power means energized until said electrical circuit is interrupted, and timing means for interrupting the heating circuit and the power means holding circuit.

References Cited in the file of this patent

UNITED STATES PATENTS

| | | |
|---|---|---|
| 2,651,444 | Casey et al. | Sept. 8, 1953 |
| 2,749,686 | Lorenz et al. | June 12, 1956 |